(12) United States Patent
Gallagher et al.

(10) Patent No.: US 6,325,050 B1
(45) Date of Patent: Dec. 4, 2001

(54) METHOD AND SYSTEM FOR CONTROLLING FUEL INJECTION TIMING IN AN ENGINE FOR POWERING A LOCOMOTIVE

(75) Inventors: Michael Shawn Gallagher; Eric Dillen, both of Erie; Vince Dunsworth, Edinboro, all of PA (US)

(73) Assignee: General Electric Company

( * ) Notice: Subject to any disclaimer, the term of this patent is extended or adjusted under 35 U.S.C. 154(b) by 0 days.

(21) Appl. No.: 09/535,934

(22) Filed: Mar. 24, 2000

(51) Int. Cl.$^7$ .................................................. F02M 51/00
(52) U.S. Cl. ................................................. 123/478; 701/19
(58) Field of Search ................................... 123/478, 295, 123/305, 430; 73/116, 117.3; 701/19, 101, 115

(56) References Cited

U.S. PATENT DOCUMENTS

| | | | |
|---|---|---|---|
| 3,762,379 | * 10/1973 | Hobo et al. | 123/32 |
| 3,863,612 | 2/1975 | Wiener | 123/41.08 |
| 4,782,794 | 11/1988 | Hsu et al. | 123/23 |
| 5,113,830 | * 5/1992 | Haines | 123/436 |
| 5,282,570 | 2/1994 | Johnson et al. | 239/5 |
| 5,287,840 | 2/1994 | Catanu et al. | 123/508 |
| 5,394,851 | 3/1995 | Cryer et al. | 123/476 |
| 5,428,992 | 7/1995 | Wolfe et al. | 73/116 |
| 5,691,625 | 11/1997 | Kumar et al. | 322/20 |
| 5,806,011 | 9/1998 | Azzaro et al. | 70/99 |
| 5,901,683 | 5/1999 | Patel | 123/352 |
| 5,961,567 | 10/1999 | Azzaro et al. | 123/352 |
| 6,158,416 | * 12/2000 | Chen et al. | 123/380 |

* cited by examiner

Primary Examiner—Henry C. Yuen
Assistant Examiner—Mahmoud M Gimie
(74) Attorney, Agent, or Firm—Carl A. Rowold, Esq.; Enrique J. Mora, Esq.; Beusse Brownlee Bowdoin & Wolter PA (57) ABSTRACT

A system and method for controlling fuel injection timing in an engine operable in a selected one of a plurality of engine notch positions are provided. The system includes a module for determining whether a fuel value indicative of a fuel quantity to be delivered to the engine is within a predetermined fuel value range for the selected one of the plurality of notches. The system further includes a module for setting a predetermined fuel injection timing value that uniquely corresponds to the selected one of the plurality of notches upon verification that the fuel value is within the predetermined fuel value range.

37 Claims, 3 Drawing Sheets

METHOD AND SYSTEM FOR CONTROLLING FUEL INJECTION TIMING IN AN ENGINE FOR POWERING A LOCOMOTIVE

BACKGROUND OF THE INVENTION

The present invention is generally related to fuel control systems, and, more particularly, the present invention is related to electronic fuel injection (EFI) control systems and techniques for adjusting injection timing control of compression ignition engines to reduce exhaust emissions and/or improve engine efficiency.

Figure 1:
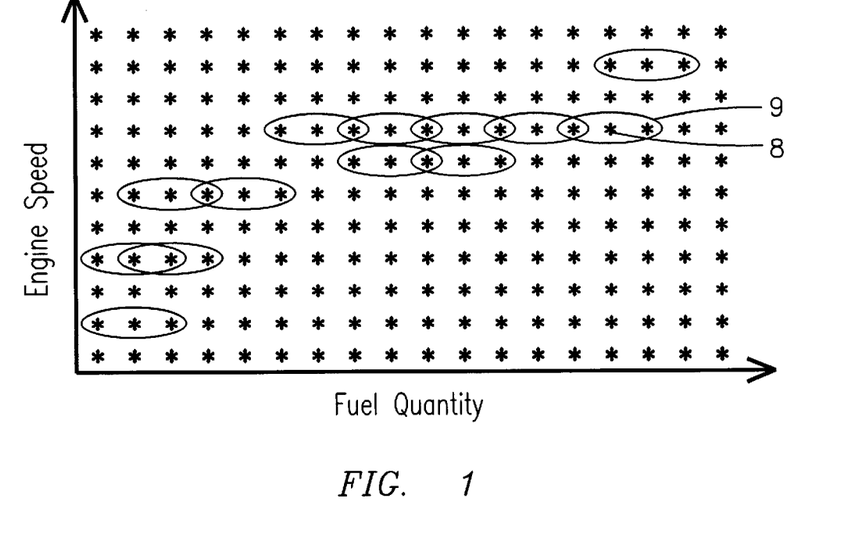
FIG. 1 is an exemplary graphical representation of a look-up table that allows for mapping injection timing values as a function of engine speed and fuel values, which mapping may now be improved with the techniques and fuel injection system of the present invention.

Relatively large compression ignition engines, such as diesel engines used in locomotive or marine applications, may recently have the ability to vary start of injection timing (timing). See U.S. Pat. No. 5,394,851 for a description of an EFI system that provides variable injection timing to such engines. For example, as represented in FIG. 1, the injection timing may be obtained from a two-dimensional look-up table that in concept should map a respective timing value as a function of engine speed and a fuel value or quantity to be delivered to each cylinder of the engine. Unfortunately, since the mapping is executed in finite increments of engine speed and fuel values, most operating points need a double interpolation to calculate timing for a given set of engine speed and fuel values.

As will be appreciated by those skilled in the art, a locomotive throttle may be operable at a plurality of different power positions or notches. For example, there may be eight power positions or notches (N), plus idle. N1 may correspond to the minimum desired engine speed or power, while N8 may correspond to maximum speed and full power. In general, a notch specifies a commanded engine speed and power and nominally would define a point in the two-dimensional look-up table to get a suitable injection timing. Although the concept of mapping is straight forward, there are some practical considerations that have generally prevented obtaining a unique injection timing value for a given notch. First, there may be more than one notch for a given engine speed and this causes such notches to share the same area in the map. Second, the fuel value may depart or deviate from a nominal timing value, e.g., nominal operating point 7, due to various external variables, such as ambient temperature, atmospheric pressure, fuel temperature, fuel quality, fuel injection equipment wear, variation from locomotive-to-locomotive, etc. The foregoing fuel value deviations transform what originally should have been a single operating point into a band of possible operating injection timing values, e.g., operating band 8. The band size may be relatively large since the fuel value deviations may be correspondingly large. The above-described conditions result in operating points that overlap, as represented by the dashed ovals in FIG. 1, and do not uniquely identify a respective timing value for each respective notch.

With the introduction of relative stringent exhaust emission regulations on locomotives, it becomes particularly desirable to be able to set a unique fuel injection timing value at each notch. Although reducing the size of the increments between the engine speed and fuel values would somewhat reduce the amount of overlap in most conditions, this approach would require a two-dimensional table that would require significantly more memory and processing power in a controller. Another approach would be to design the EFI system so that the engine runs the same timing in all notches that are known to overlap. Unfortunately, such approach does not provide an optimum solution for engine performance and reduction of exhaust emissions. Thus, it would be desirable to provide an EFI control system and techniques that, upon recognizing that the engine is in a normal operating condition, as opposed to a transient operating condition or strenuous environmental conditions, allow for assigning a unique injection timing value to each respective notch. It is also desirable to be able to adjust the set timing based on the values of predetermined variables capable of affecting the characteristics of the combustion process so as to increase engine efficiency and reduce respective levels of exhaust emissions, such as nitrogen oxides ($NO_x$) and other pollutants. Examples of such variables may include atmospheric or barometric pressure, manifold air temperature, oxygen concentration, humidity levels, fuel type, engine type, equipment age, etc.

SUMMARY OF THE INVENTION

Generally speaking, the present invention fulfills the foregoing needs by providing in one embodiment a method for controlling fuel injection timing in an engine operable in a selected one of a plurality of engine notch positions. The method allows for determining whether a fuel value indicative of a fuel quantity to be delivered to the engine is within a predetermined fuel value range for the selected one of the plurality of notches. The method further allows for setting a predetermined fuel injection timing value that uniquely corresponds to the selected one of the plurality of notches upon verification that the fuel value is within the predetermined fuel value range.

The present invention may further fulfill the foregoing needs by providing a system for controlling fuel injection timing in an engine operable in a selected one of a plurality of engine notch positions. The system includes a module for determining whether a fuel value indicative of a fuel quantity to be delivered to the engine is within a predetermined fuel value range for the selected one of the plurality of notches. The system further includes a module for setting a predetermined fuel injection timing value that uniquely corresponds to the selected one of the plurality of notches upon verification that the fuel value is within the predetermined fuel value range.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figure 2:
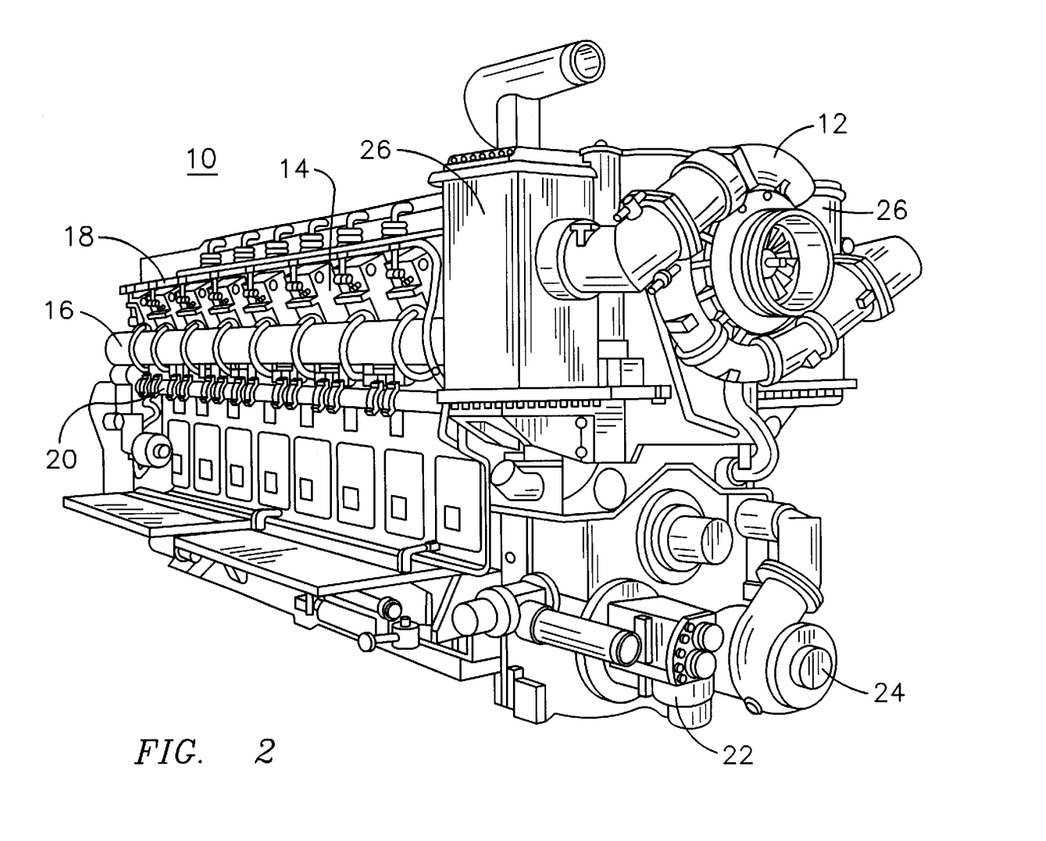
FIG. 2 is a perspective view of an exemplary diesel locomotive engine that may benefit from the techniques and electronic fuel injection system of the present invention.

FIG. 2 generally depicts an exemplary compression ignition diesel engine 10 which employs an electronic fuel control system in accordance with the invention. The engine 10 may be any relatively large diesel engine, such as diesel engine models FDL-12, FDL-16, or HDL, as manufactured by General Electric Company, at Grove City, Pa. Such an engine may include a turbo charger 12 and a series of unitized power or fuel injection assemblies 14. For example, a 12-cylinder engine has 12 such power assemblies while a 16 cylinder engine has 16 such power assemblies. The engine 10 further includes an air intake manifold 16, a fuel supply line 18 for supplying fuel to each of the power assemblies 14, a water inlet manifold 20 used in cooling the engine, a lube oil pump 22 and a water pump 24, all as known in the art. An intercooler 26 connected to the turbo charger 12 facilitates cooling of the turbo charged air before it enters a respective combustion chamber inside one of the power assemblies 14. The engine may be a Vee-style type, also as known in the art.

Figure 3:
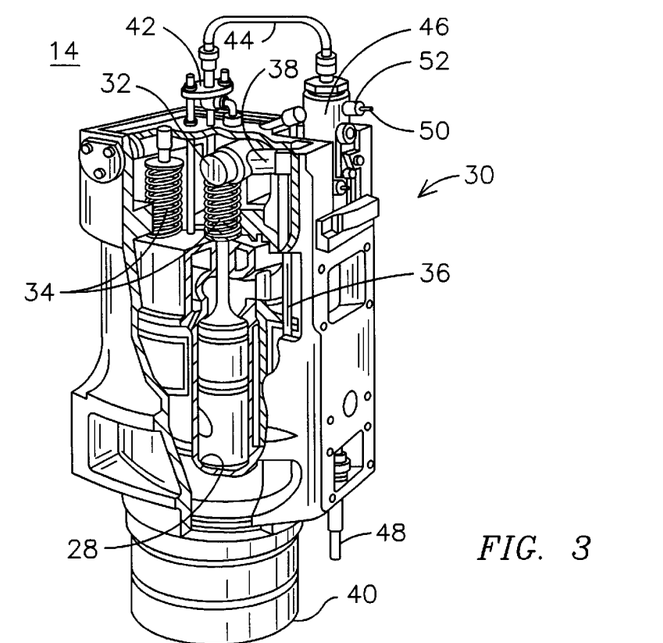
FIG. 3 is a partial cut away view of an exemplary fuel injection assembly that may be controlled by an electronic fuel injection controller embodying the present invention.

FIG. 3 depicts one of the plurality of power assemblies 14 which includes a cylinder 28 and a corresponding fuel delivery mechanism generally indicated at 30 for delivering fuel to the combustion chamber within the cylinder 28. Each unitized power assembly 14 may further include an air valve rocker arm shaft 32 for moving a plurality of spring-biased air valves generally indicated at 34. The valve rocker arm shaft 32 is connected to the valve pushrod 36 through the valve rocker arm 38. The air valve rocker arm shaft 32 is connected to a valve pushrod 36 and is actuated as known in the art.

Each unitized power assembly 14 further includes a cylinder liner 40 which is insertable into a bored aperture (not shown) in the engine block of the engine 10. The unitized power assembly 14 includes a cylinder jacket or casting for housing the cylinder 28 and associated components. For a typical engine 10, such as may be used in locomotive applications, an exemplary range of injection pressure is between approximately 15–20 k.p.s.i. An exemplary fuel delivery flow volume range is between about 100–1600 mm3/stroke. An exemplary range of per cylinder displacement may be from about 5.5 liters to about 11 liters. It will be appreciated that the present invention is not limited to the above-described exemplary ranges.

The fuel delivery mechanism 30 includes a fuel injecting mechanism 42 connected to a high-pressure injection line 44 which fluidly connects to a fuel pressure generating unit 46 such as a fuel pump. This configuration is known as a pump-line-nozzle configuration. The fuel pressure generating unit 46 builds pressure through the actuation of fuel pushrod 48. The fuel delivery mechanism 30 includes an electronic signal line 50 for receiving electronic signals from an electronic controller, as will be described later. The electronic signal line 50 provides a control signal to an electronically-controlled valve 52 which forms part of the fuel delivery mechanism 30. The unitized power assembly 14 derives its name from the fact that each cylinder and accompanying components (or power assembly) may be removed from the engine individually to facilitate servicing. Consequently, the entire engine need not be removed or replaced to facilitate repair of the cylinder or any of its associated components. It will be appreciated that the system and techniques of the present invention are not limited to unitized power assemblies.

As described in U.S. patent application Ser. No. 09/431, 721, titled "A Method and System for Predictably Assessing Performance of a Fuel Pump in a Locomotive", assigned to the same assignee of the present invention and herein incorporated by reference, a fuel value parameter, that is, the amount of fuel to be delivered into each of the cylinders of the engine is adjusted up or down by an engine controller in order to maintain constant engine speed as the operating load of the locomotive varies or as the individual fuel pumps wear out or fail, or as the locomotive operates in environmentally demanding conditions, such as substantially low ambient temperature or barometric pressure, or traveling in a tunnel that may result in relatively high ambient temperature, etc.

As described in further detail in such application, an estimation of the fuel value calculated by the engine controller is helpful for determining whether any of the fuel pumps has either failed or has begun to show varying degrees of deterioration. In the event that one or more pumps, singly or in combination, fail to perform within acceptable levels, this condition effectively results in an overall fewer number of pumps available for injecting fuel into engine 10. By way of example, wear out of various components within the pump may cause the pump to deliver less fuel or may cause the pump not to deliver any fuel to its respective fuel injector. Exemplary failure modes for one type of pump assembly may include valve seat wear, stator cavitation, loose or broken bolts. It will be appreciated that other failure modes may occur depending on the specific type of pump assembly being used. In the event that either of these conditions are present, some of the primary effects may result as previously suggested, in the pump not supplying any fuel, or in supplying a lower amount of fuel than under standard operating conditions. For example, for a notch call signal of eight, a fuel pump may have a rate of fuel delivery of about 1450 cubic millimeters per stroke. It will be appreciated, however, that as the pump wears out, the pump may require more solenoid "on time" to deliver the same amount of fuel due to lower fuel injection pressures across the same physical restriction, such as the diameter of an injector nozzle. The techniques described in the above-referred patent application allow for using existing signals that are available without having to add additional sensors to the locomotive. For example, there is a feedback signal supplied by the engine controller that is indicative of power piston gap and monitoring of this signal and through uses of a suitable transfer function allows for accurately estimating the fuel value based on the following equation:

$$PFV = K1 - (K2 \times LVDT), \quad \text{Eq.1,}$$

wherein K1 and K2 are experimentally and/or empirically derived constants and LVDT is the signal indicative of the power piston gap (PPG) as could be supplied by a displacement transducer. As will be appreciated by those skilled in the art, this is one exemplary technique that may be used for measuring the fuel value and is analogous to measuring a throttle valve position. In lieu of using the foregoing exemplary technique for indirectly measuring the fuel value, one could readily measure the fuel value directly from the fuel injector mechanism.

As will be appreciated by those skilled in the art, there are a number of external conditions and other factors that may affect the actual value of the fuel value actually delivered by fuel pump 46. Examples of such external conditions and factors may include the altitude where the locomotive operates, the ambient temperature, whether the locomotive is traveling in a tunnel since tunnel travel may result in increased operating temperature, locomotive to locomotive variation, age of the fuel pump and the type of fuel quality used by the locomotive, such as fuel cetane level or heating value and the like. Thus, it would be particularly desirable to adjust the value of the monitored PPG signal for deviations from the predicted fuel value obtained from Eq. 1 above. The adjusted fuel value (AFV) may be computed based on the following equation:

$$AFV = PFV/KAT \times KBP \times KFT \times KFQ \times KL\text{-}L \times KAGE, \quad \text{Eq. 2,}$$

wherein PFV is the predicted fuel value and KAT, KBP, KFT, KFQ, KL-L, and KAGE denote a respective corrective or adjusting factor respectively corresponding to the following predetermined external variables: air temperature, barometric pressure, fuel temperature, fuel quality, locomotive-to-locomotive variation, and equipment age. As suggested above and further described below, for the purposes of achieving robust and accurate injection timing control, it may be desirable to optionally execute fuel value adjustments due to such external variables to reduce errors that otherwise could be introduced in the injection timing value as a result of the deviations in the fuel value from the predicted nominal fuel value.

Figure 4:
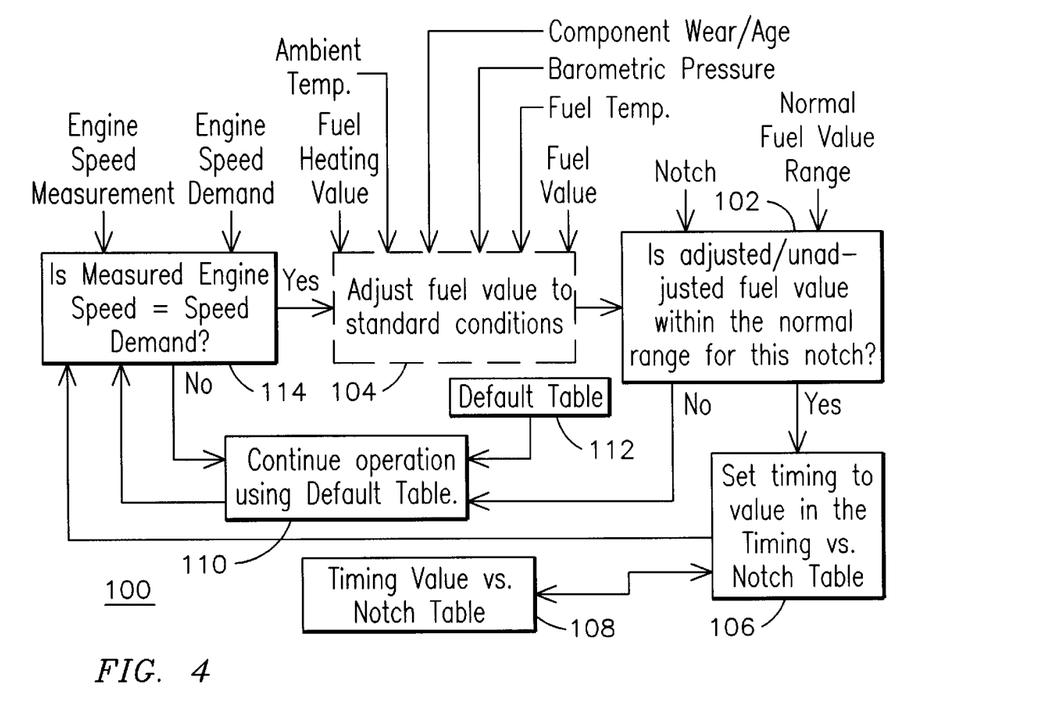
FIG. 4 is a schematic block diagram of one exemplary embodiment of the electronic fuel injection system of the present invention.

As shown in FIG. 4, an EFI system 100 allows for controlling fuel injection timing in engine 10 (FIG. 1), that as suggested above, may be operable in a selected one of a plurality of engine notch positions. As described below, the control techniques of the present invention may be executed upon recognizing that the engine is in a normal operating condition, as opposed to a transient operating condition or under strenuous environmental conditions or incipient malfunctions. For example, as shown in FIG. 4, system 100 includes a module 102 for determining whether the fuel value to be delivered to each cylinder of the engine is within a predetermined fuel value range suitable for the selected one of the plurality of notches. As suggested above, in a preferred embodiment of the present invention, an optional module 104, drawn as a dashed block, allows for adjusting the fuel value for deviations from the estimated nominal fuel value to generate an adjusted fuel value. Assuming module 104 is used to execute adjustments to the fuel value, then module 102 will use the adjusted fuel value for determining whether such adjusted fuel value is within the predetermined fuel value range for the selected notch. Conversely, if module 104 is not used to execute adjustments to the fuel value, then module 102 will simply use the unadjusted fuel value for determining whether such unadjusted fuel value is within the predetermined fuel value range for the selected notch. It will be appreciated that because the normal operating band is defined more precisely, using adjusted fuel values may result in a more accurate determination of injection timing values than would be the case when unadjusted fuel values are used.

System 100 further includes a module 106 for setting a predetermined fuel injection timing value that uniquely corresponds to the selected notch upon verification that the adjusted or unadjusted fuel value is within the predetermined fuel value range. The predetermined fuel injection timing values respectively assigned to each notch position may be stored in a suitable memory unit 108, such as a look-up table, coupled to supply the unique timing value for the selected notch. The actual timing values for any specific engine may be obtained using modeling, or simulation techniques as well as empirically or experimentally-derived timing values or combination of the above techniques. Any such techniques will be readily known and understood by those of ordinary skill in the art and need not be described in any further details for the purposes of the present invention. If module 102 determines that the fuel value is outside the predetermined fuel value range for the selected notch, then the injection timing process continues at a default module 110 that is coupled to a default look-up table 112 that may use the two-dimensional mapping techniques discussed in the context of FIG. 1, at least until the engine is determined to have recovered into a normal mode of operation. As suggested above, default module 110 could also be arrived to if a module 114 determines that the engine is not in a steady-state mode of operation. By way of example, module 114 may comprise a comparator coupled to receive respective signals indicative of an engine speed measurement and of an engine speed demand so that if the values of such signals are not equal to one another or within a predetermined range from one another, then the injection timing process will continue at default made 110 until the engine is determined to be in steady state.

Figure 5:
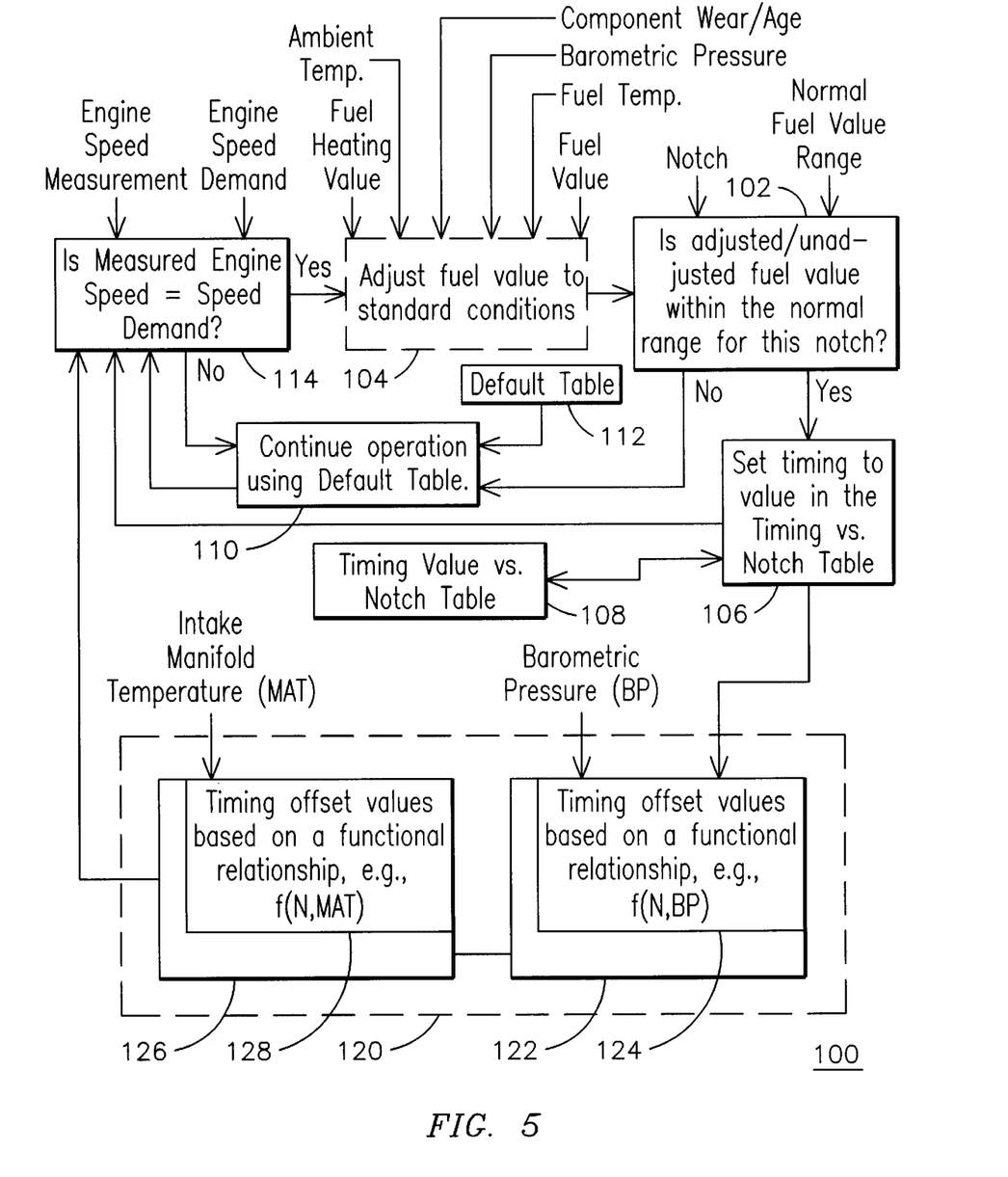
FIG. 5 is a schematic block diagram of another exemplary embodiment of the electronic fuel injection system of the present invention.

FIG. 5 illustrates another exemplary embodiment of EFI system 100 that allows for adjusting the timing value set with the embodiment described in the context of FIG. 4 and thus any functional and operational interrelationships of modules already discussed in the context of FIG. 4 will not be repeated. As shown in FIG. 5, system 100 further comprises a module 120 coupled to module 106 for executing predetermined offset adjustment to the fuel timing value set by module 106 with the objective of further reducing exhaust emissions from the engine and/or improving engine efficiency, e.g., improving the ratio of useful energy produced by the engine relative to the energy consumption of the engine during a specific period of operation. The offset adjustments made by module 120 are preferably based on respective values of one or more predetermined variables capable of affecting or influencing the engine combustion process so as to reduce the level of engine emissions while increasing engine efficiency. In general, the input variables used by module 120 to execute appropriate offset adjustments to the timing value may comprise variables indicative of any external condition and/or engine performance, and capable of influencing air-to-fuel ratio and combustion characteristics, either locally or globally in the combustion chamber. Some examples of variables indicative of external conditions that affect the combustion process may comprise manifold air temperature, barometric pressure, manifold air pressure, ambient temperature, humidity, in-cylinder emission levels, exhaust temperature, turbo speed, etc. It will be appreciated that engine performance parameters may be derived from respective sensor readings that allow for predicting combustion characteristics. One example of a derivation of such parameters may be calculating rate of pressure rise/decrease from an in-cylinder pressure sensor. Another example may be using a sensor for measuring oxygen concentration prior to a combustion cycle in the air drawn into the cylinders, or using respective sensors for measuring concentration of emissions in the exhaust of the engine. Further, the timing values can be adjusted based on component age, which can be stored in suitable storage units in the locomotive or EFI controller, for components that affect the combustion process as such components age or wear out. Other parameters that affect the combustion process and could be used to adjust timing may be parameters stored in such memory units and may be useful to determine locomotive-specific properties, such as the various fuel properties of the specific fuel being used by a given locomotive, or the various engine characteristics of a given type of engine.

The exemplary embodiment shown in FIG. 5, for the sake of simplicity of illustration and description, presumes that the specific variables chosen to adjust the fuel timing value in module 120 are barometric pressure and intake manifold temperature, however, as noted above such variables are merely exemplary of multiple variables or combinations thereof that could be used for executing the fuel timing adjustment. As shown in FIG. 5, module 120 may include a submodule 122 having a memory unit, such as a two dimensional look-up table 124 that stores timing offset values as a function of notch and barometric pressure. Similarly, module 120 may further include a submodule 126 having another two dimensional look-up table 128 that stores timing offset values as a function of notch and intake manifold temperature. It will be appreciated that the timing offset adjustments executed by module 120 need not be limited to the timing values set by module 106 since module 120 could be coupled to receive injection timing values derived using the two-dimensional mapping techniques discussed in the context of FIG. 1 Although such implementation would not likely achieve the full benefits discussed in the context of FIG. 4, it is likely that such offsets would still contribute to reduce engine exhaust emissions and/or engine efficiency.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling fuel injection timing in an engine operable in a selected one of a plurality of engine notch positions, the method comprising the steps of:
   determining whether the engine is in a steady state mode of operation;
   determining whether a fuel value indicative of a fuel quantity to be delivered to the engine is within a predetermined fuel value range for the selected one of the plurality of notches;
   setting a predetermined fuel injection timing value that uniquely provides a one-to-one correspondence to the selected one of the plurality of notches upon verification that the fuel value is within the predetermined fuel value range; and
   in the event the fuel value is outside the predetermined fuel value range and/or the engine is not in steady state, setting a fuel injection value from a band of timing values generally extending beyond the selected one of the plurality of notches.

2. The method of claim 1 further comprising adjusting the fuel value for deviations from an estimated nominal fuel value due to at least one variable associated with the engine to generate an adjusted fuel value.

3. The method of claim 2 wherein the setting step of a unique timing value comprises setting the predetermined fuel injection timing upon verification that the adjusted fuel value is within the predetermined fuel value range.

4. The method of claim 1 wherein the engine comprises a multi-cylinder engine coupled to power a locomotive.

5. The method of claim 3 wherein the setting step of a unique timing value comprises setting the predetermined fuel injection timing value for each of the cylinders of the engine.

6. The method of claim 4 wherein the variable associated with the engine is selected from the group consisting of ambient temperature, atmospheric pressure, fuel quality, fuel temperature, fuel injection equipment age, and expected variation from equipment-to-equipment.

7. The method of claim 1 further comprising a step of executing a predetermined adjustment to the set fuel injection timing value based on a respective value of one or more predetermined variables able to influence engine combustion characteristics.

8. The method of claim 7 wherein the variables used for adjusting the set fuel injection timing value comprise variables indicative of predetermined external conditions.

9. The method of claim 7 wherein the variables used for adjusting the set fuel injection timing value comprise variables indicative of predetermined engine operational parameters.

10. The method of claim 7 wherein the predetermined variables used for adjusting the set fuel injection timing value comprise variables indicative of an air-to-fuel ratio.

11. The method of claim 7 wherein the adjustment to the fuel injection timing value is based on the value of atmospheric pressure.

12. The method of claim 7 wherein the adjustment to the fuel injection value is based on the value of manifold temperature.

13. The method of claim 7 wherein the adjustment to the fuel injection timing value is based on the respective values of atmospheric pressure and/or manifold temperature.

14. The method of claim 7 wherein the adjustment to the fuel injection timing value is based on the respective values of atmospheric pressure and/or manifold temperature.

15. A system for controlling fuel injection timing in an engine operable in a selected one of a plurality of engine notch positions, the system comprising;
   a module for determining whether the engine is in a steady state mode of operation;
   a module for determining whether a fuel value indicative of a fuel quantity to be delivered to the engine is within a predetermined fuel value range for the selected one of the plurality of notches; and
   a module for setting a predetermined fuel injection timing value that uniquely provides a one-to-one correspondence to the selected one of the plurality of notches upon verification that the fuel value is within the predetermined fuel value range, and, in the event the fuel value is outside the predetermined fuel value range, and/or the engine is not in steady state, setting a fuel injection value from a band of timing values overlapping the selected one of the plurality of notches.

16. The system of claim 15 further comprising means for determining whether the engine is in a steady state mode of operation.

17. The system of claim 16 wherein the module for determining whether the engine is in steady state comprises a comparator coupled to compare actual engine speed against a commanded engine speed.

18. The system of claim 16 further comprising a module for adjusting the fuel value for deviations from an estimated nominal fuel value due to at least one variable associated with the engine to generate an adjusted fuel value.

19. The system of claim 18 wherein the setting module is coupled to a look-up table for retrieving therefrom the unique fuel injection timing value to be set upon verification that the adjusted fuel value is within the predetermined fuel value range.

20. The system of claim 15 further comprising a default look-up table including the band of timing values overlapping the selected one of the plurality of notches.

21. The system of claim 15 wherein the engine comprises a multi-cylinder engine coupled to power a locomotive.

22. The system of claim 21 wherein the setting module is coupled to set the unique fuel injection timing value for each of the cylinders of the engine.

23. The system of claim 18 wherein the variable associated with the engine is selected from the group consisting of ambient temperature, atmospheric pressure, fuel quality, fuel temperature, fuel injection equipment age, and expected variation from equipment-to-equipment.

24. The system of claim 15 further comprising an adjustment module for executing a predetermined adjustment to the set fuel injection timing value based on a respective value of one or more predetermined variables able to influence engine combustion.

25. The system of claim 24 wherein the variables used for adjusting the set fuel injection timing value comprise variables indicative of predetermined external conditions.

26. The system of claim 24 wherein the variables used for adjusting the set fuel injection timing value comprise variables indicative of predetermined engine operational parameters.

27. The system of claim 24 wherein the predetermined variables used for adjusting the set fuel injection timing value comprise variables indicative of an air-to-fuel ratio.

28. The system of claim 24 wherein the adjustment to the fuel injection timing value is based on the value of atmospheric pressure.

29. The system of claim 24 wherein the adjustment to the fuel injection value is based on the value of manifold temperature.

30. The system of claim 24 wherein the adjustment to the fuel injection timing value is based on the respective values of atmospheric pressure and/or manifold temperature.

31. The system of claim 18 wherein the adjustment to the fuel injection timing value is based on the respective values of atmospheric pressure and/or manifold temperature.

32. A method for controlling fuel injection timing in an engine operable in a selected one of a plurality of engine notch positions, the method comprising:

determining whether the engine is in a steady state mode of operation;

determining whether a fuel value indicative of a fuel quantity to be delivered to the engine is within a predetermined fuel value range for the selected one of the plurality of notches;

adjusting the fuel value for deviations from an estimated nominal fuel value by:

providing a module of nominal fuel values based on data collected from other engines corresponding to the engine whose fuel injection timing is being controlled, the nominal fuel values constituting a first set of fuel values relative to a first set of operational and environmental conditions for the engines;

sensing at least one variable associated with the engine at the time of determining whether the fuel value delivered to the engine is within the predetermined fuel value range, said at least one variable being indicative of a second set of operational and environmental conditions of the engine influencing at least in part fuel values delivered to the engine, the delivered fuel values constituting a second set of fuel values;

adjusting the respective values of one of the first and second sets of fuel values relative to the other to account for differences between the first and second sets of operational and environmental conditions; and setting a predetermined fuel injection timing value that uniquely has a one-to-one correspondence to the selected one of the plurality of notches upon verification that the adjusted fuel value is within the predetermined fuel value range and the engine is in steady state.

33. The method of claim 32 wherein the variable associated with the engine is selected from the group consisting of ambient air temperature, barometric pressure, fuel quality, fuel temperature, fuel injection equipment age, and expected variation from equipment-to-equipment.

34. The method of claim 32 wherein the first set of fuel values is adjusted relative to the differences between the first and second sets of operational and environmental conditions.

35. The method of claim 32 wherein the second set of fuel values is adjusted relative to the differences between the first and second sets of operational and environmental conditions.

36. A system for controlling fuel injection timing in an engine operable in a selected one of a plurality of engine notch positions, the system comprising:

a module for determining whether the engine is in a steady state mode of operation;

a module for determining whether a fuel value indicative of a fuel quantity to be delivered to the engine is within a predetermined fuel value range for the selected one of the plurality of notches;

an adjuster module for adjusting the fuel value for deviations from an estimated nominal fuel value, said adjuster comprising:

a module of nominal fuel values based on data collected from other engines corresponding to the engine whose fuel injection timing is being controlled, the nominal fuel values constituting a first set of fuel values relative to a first set of operational and environmental conditions for the engines;

a sensor for sensing at least one variable associated with the engine at the time of determining whether the fuel value delivered to the engine is within the predetermined fuel values, said at least one variable being indicative of a second set of operational and environmental conditions of the engine influencing at least in part fuel values delivered to the engine, the delivered fuel values constituting a second set of fuel values;

a module for adjusting the respective values of one of the first and second sets of fuel values relative to the other to account for differences between the first and second sets of operational and environmental conditions; and a module for setting a predetermined fuel injection timing value that uniquely corresponds to the selected one of the plurality of notches upon verification that the fuel value is within the predetermined fuel value range and the engine is in steady state.

37. An article of manufacture comprising:

a computer program product comprising a computer-usable medium having a computer-readable code therein for controlling fuel injection timing in an engine operable in a selected one of a plurality of engine notch positions, the computer-readable code in the article of manufacture comprising:

computer-readable program code for determining whether a fuel value indicative of a fuel quantity to be delivered to the engine is within a predetermined fuel value range for the selected one of the plurality of notches; and computer-readable code for setting a predetermined fuel injection timing value that uniquely provides a one-to-one correspondence to the selected one of the plurality of notches upon verification that the fuel value is within the predetermined fuel value range and the engine is in the steady state mode of operation.

* * * * *

UNITED STATES PATENT AND TRADEMARK OFFICE
CERTIFICATE OF CORRECTION

PATENT NO. : 6,325,050 B1
DATED : December 4, 2001
INVENTOR(S) : Gallagher et al.

It is certified that error appears in the above-identified patent and that said Letters Patent is hereby corrected as shown below:

<u>Title page,</u>
Item [75], the first named inventor should read as follows:

-- Shawn Michael Gallagher (in lieu of Michael Shawn Gallagher). --

Signed and Sealed this

Thirtieth Day of July, 2002

*Attest:*

*Attesting Officer*

JAMES E. ROGAN
*Director of the United States Patent and Trademark Office*